F. H. REAM.
UNIVERSAL JOINT.
APPLICATION FILED FEB. 15, 1919.

1,322,341.

Patented Nov. 18, 1919.
2 SHEETS—SHEET 1.

WITNESS:
F. E. Kenney
F. E. Small

INVENTOR.
Fred H. Ream
BY M. C. Gillham
ATTORNEY.

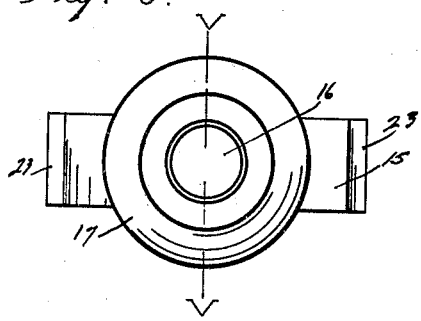
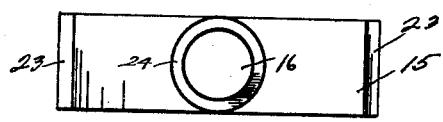
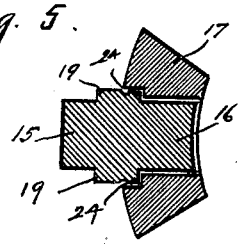
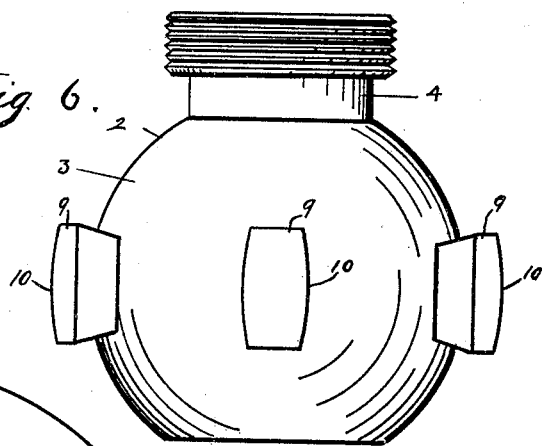
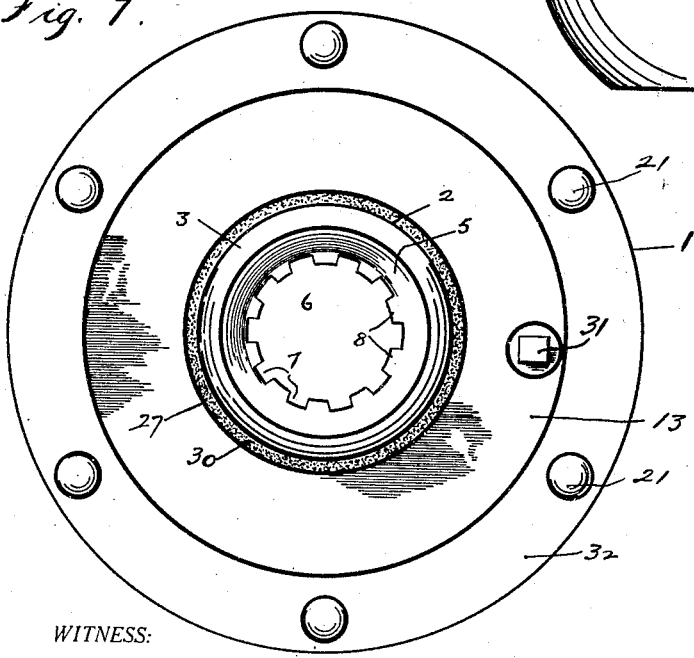

UNITED STATES PATENT OFFICE.

FRED H. REAM, OF KANSAS CITY, MISSOURI, ASSIGNOR TO R.-S. MANUFACTURING COMPANY, OF KANSAS CITY, MISSOURI.

UNIVERSAL JOINT.

1,322,341.  Specification of Letters Patent.   Patented Nov. 18, 1919.

Application filed February 15, 1919. Serial No. 277,381.

*To all whom it may concern:*

Be it known that I, FRED H. REAM, a citizen of the United States, residing at Kansas City, in the county of Jackson and State of Missouri, have invented a new and useful Improvement in Universal Joints, of which the following is a specification.

My invention relates to improvements in universal joints and particularly to a device of this character which is used in connection with the driving mechanism of automobiles.

The object of my invention is to improve the construction and simplify the parts of universal joints, by the provision of a mobile member having facility for receiving and detaining the spline end of shafting, second, by the provision of a housing for the mobile member comprising interchangeable parts provided with lubricating chambers and annular concentrically arranged slide bearings adapted for slidably supporting the mobile member, third, by the provision of an annular seat in the lock rings adapted for receiving a gasket and spring washer to prevent waste of lubricating material and, fourth, by the provision of a sectional ring adapted for interlocking with the lock rings and carrying rollers in engagement with the cogs on the mobile member.

Figure 1:
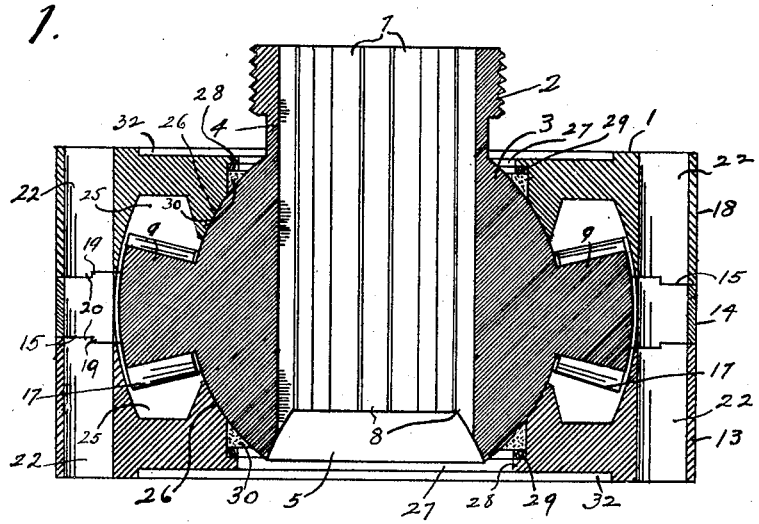
Figure 2:
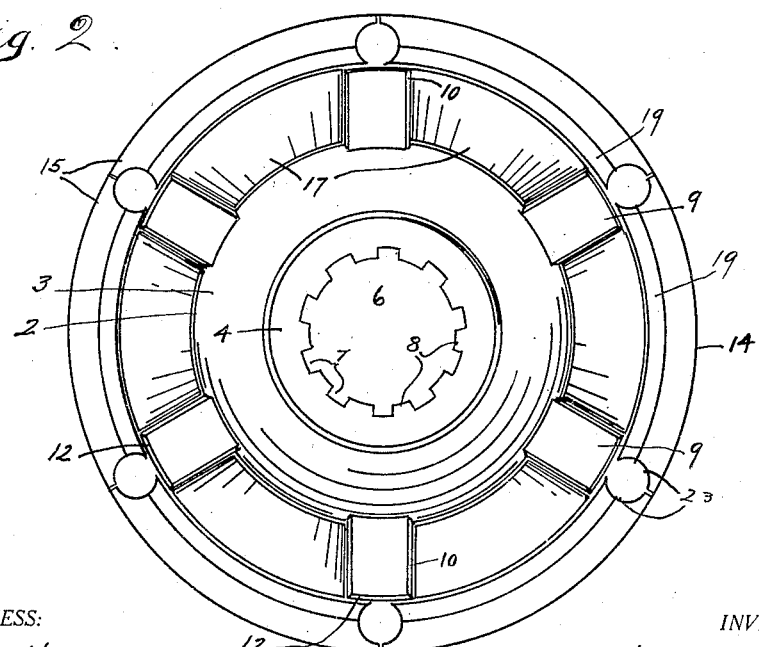

I attain these objects and other advantages by means of the structure and combination of parts illustrated in the accompanying drawings in which—Figure 1, is a longitudinal section of a universal joint constructed in accordance with my invention; Fig. 2, is an end view of the universal joint, the outer lock ring being removed to disclose the mobile member and the rollers on the sectional ring in operative engagement; and showing the channeled core of the mobile member; Fig. 3, is an elevation of one of the segments of the sectional ring, and showing the roller thereon; Fig. 4, is the same, the roller being removed to show the shoulder on the stud; Fig. 5, is a cross section through one of the segments of the sectional ring and roller thereon, on the line V—V, in Fig. 3; Fig. 6, is an elevation of the mobile member, and Fig. 7, is an end view of the outer side of one of the lock rings and operatively assembled with the outer end of the mobile member, and showing the depression in the outer end of the latter and the channels and ribs therein for receiving the spline end of shafting.

Similar numerals of reference refer to corresponding parts throughout the several views.

The numeral 1, designates a universal joint constructed in accordance with my invention. 2, is a mobile member comprising a spherical body portion 3, and a cylindrical stem 4, which is formed integral with the upper end of the body portion. A circular concaved depression 5, is formed in the lower end of the body portion. A core 6, is extended through the stem 4, and continuing through the body portion 3, and opening into the depression 5. Longitudinally extending channels 7, are formed in the wall of the core 6, thereby forming between the channels, ribs 8, and adapting the core for receiving the spline end of shafting. Radially projecting cogs 9, are formed integral with and circumferentially of the body portion, at regular intervals, and their sides are convexed, as shown at 10, in Figs. 2 and 6, and their ends are formed concentric with the spherical body portion, as shown in Fig. 2, at 12. The end portion of the stem 4, is provided with external screw threads adapted for receiving screw caps or couplings. The mobile member is preferably made of steel of suitable texture to permit case-hardening or other tempering of the same.

A housing is provided for the mobile member and consists of a bearing box 13, a sectional ring 14, comprising segments 15, provided on their inner sides with studs 16, having rollers 17, revolubly mounted thereon and disposed between the cogs 9, on the mobile body member, and a bearing box 18, similar to box 13, and which is inverted and disposed in opposition to the latter. Shoulders 19, are formed on the upper and lower edges of the segments 15, and are adapted to receive annular shoulders 20, which are formed on the outer edges of the bearing boxes 13 and 18, whereby the housing is held in place and the parts mentioned interlocked, the adjustment being preserved by bolts 21, which are extended through bolt holes 22 provided in the bearing boxes and sectional ring, the ends of the segments 15, are concaved in a suitable degree to provide passage for the bolts, as shown at 23, in Figs. 2, 3 and 4. The segments 15, are formed concentric with the spherical body portion of mobile member. The rollers 17, are substantially cone-shaped and their inner and outer sides are formed concentric with the spherical body portion of the mobile member, the outer sides of the rollers are depressed centrally and the depression is adapted to receive shoulders 24, on the studs 16, in such a manner that the roller may slide thereon. The bearing boxes 13 and 18, with similar annular extending depressions 25, having their outer sides formed concentric with the spherical body portion of the mobile member and adapted for allowing the cogs 9, to enter the same, and thereby forming a compartment when the parts are operatively assembled which is adapted for the operative movements of the mobile member and for the storage of lubricating materials, such as oil, grease and the like. The edges of the inner sides of the depressions 25, are formed concentric with the spherical body portion of the mobile member and form bearings 26, which are adapted to slidably receive the spherical body portion 3, of the mobile member, when the parts are operatively assembled. Openings 27, are provided in the bearing boxes 13 and 18, having suitable diameter to permit the stem 4 of the mobile member to incline in a suitable degree. Annular extending shoulders 28, are provided at the borders of the openings and are adapted for receiving spring washers 29, to hold gaskets 30, in place therebelow to prevent waste of lubricant from the inside of the joint. Holes are provided in the plane side of the bearing boxes 13 and 18, and communicate with the depressions 25, and are adapted for the passage of lubricants, the holes are provided with plugs 31, which are removably secured therein. The outer sides of the bearing boxes are provided with annular extending seats 32, which are adapted for matching similar seats or coupling plates usually provided on shafting for connecting universal joints therewith. This provision, combined with the identical formation of the bearing boxes, makes the latter interchangeable and, therefore, economical for manufacture and repair of worn parts.

The device is assembled and operates as follows: The mobile member 2, is arranged in the bearing box 13, so that the spherical body portion thereof shall bear on the annular bearing 26. The segments 15, are then mounted on the edge of the bearing box to complete the sectional ring 14, and in such a manner that their lower shoulders 19, shall engage the annular shoulder 20, on the bearing box, and then disposed so that the rollers 17, thereon shall be disposed between the cogs 9, on the mobile member, which disposition brings the concaved ends of the segments to register with the bolt holes 22 in the box. The bearing box 18, is formed identical with and is a duplicate of the box 13. The box 18 is mounted over the mobile member and upon the sectional ring, the shoulder 20, on the box engaging the shoulders 19, at the upper edges of the segments, thereby bringing the bearing 26, to bear on the spherical body portion of the mobile member. Bolts 21, are then extended through the bolt holes 22, passing between the ends of the segments and secured in place by nuts, pins, or any of the well known fastening devices. The gaskets 30, are then applied and held in place by the spring washers 29, which are arranged under the shoulders 28. Oil or other suitable lubricating material is then supplied to the inner parts of the joints through the hole in the upper box and the plug 31, secured in place. The mobile member is then connected with the shafting by entering the spline end thereof in the core of the mobile member, the spline end being received by the channels 7, and the shaft and the stem of the mobile member connected by any suitable coupling. The opposite end of the joint is connected in the usual manner by coupling plates usually present on shafting where universal joints are connected therewith. When the shafting turns the mobile member the cogs 9, thereon engage the rollers 17, whereby the joint and the shafting connected with the housing are revolved. When the mobile member is deflected from straight alinement with the shafts the cogs are carried upward and downward between the rollers 17, the convexed sides of the cogs impinging upon the rollers impel the rollers to roll, thereby reducing the friction to a minimum.

Having described by invention what I claim is—

A universal joint, comprising an annular bearing box provided with an annular concentrically formed bearing and with a compartment extending in a circle about the bearing, a cored mobile member having a spherical body portion rotatably mounted in the bearing in said box and provided circumferentially with radially extending cogs having convexed sides and concentrically formed ends, the cored portion of the member being provided longitudinally with a plurality of channels adapted for receiving the spline ends of shafting, a plurality of concentrically formed segments mounted on said box and forming a sectional ring, said segments being provided with inwardly extending studs having shoulders and projecting between the cogs on said mobile member, cone-shaped rollers revolubly mounted on the studs on said segments and having concentrically formed ends, the outer ends of said rollers being adapted for receiving the shoulders on the studs, an inverted annular bearing box mounted on said segments and provided with an annular concentrically formed bearing rotatably engaged by the spherical body portion of said mobile member and with a compartment extending in a circle about the bearing, gaskets demountably secured on said boxes and bearing on the spherical body portion of said mobile member, and stay bolts extending through said boxes and engaging said segments.

Kansas City, Mo., Febr. 8th 1919.

FRED H. REAM.

Witnesses:
   FRED P. SPRAUL,
   F. E. KENNEY.